United States Patent [19]
Gawlick et al.

[11] Patent Number: 5,502,816
[45] Date of Patent: Mar. 26, 1996

[54] METHOD OF ROUTING A REQUEST FOR A VIRTUAL CIRCUIT BASED ON INFORMATION FROM CONCURRENT REQUESTS

[75] Inventors: Rainer Gawlick, Boston, Mass.; Charles R. Kalmanek, Jr., Short Hills; Kajamalai G. Ramakrishnan, Berkeley Heights, both of N.J.

[73] Assignee: AT&T Corp., Murray Hill, N.J.

[21] Appl. No.: 218,390

[22] Filed: Mar. 25, 1994

[51] Int. Cl.$^6$ .............................. G06F 15/173; H04J 3/26
[52] U.S. Cl. .................... 395/200.15; 370/94.1; 370/54; 379/220; 395/280
[58] Field of Search .................... 370/54, 94.1; 379/220, 379/221; 395/200, 325, 200.15

[56] References Cited

U.S. PATENT DOCUMENTS

| | | | |
|---|---|---|---|
| 4,870,641 | 9/1989 | Pattavina | 370/60 |
| 4,993,016 | 2/1991 | Richards | 370/54 |
| 5,155,854 | 10/1992 | Flynn et al. | 395/725 |
| 5,179,556 | 1/1993 | Turner | 370/94.1 |
| 5,274,643 | 12/1993 | Fisk | 370/94.1 |
| 5,317,565 | 5/1994 | Crouse et al. | 370/58.2 |
| 5,335,268 | 8/1994 | Kelly, Jr. et al. | 379/112 |
| 5,377,262 | 12/1994 | Bales et al. | 379/220 |

OTHER PUBLICATIONS

J. Aspnes et al., "On–Line Load Balancing with Application to Machine Scheduling and Virtual Circuit Routing," *23rd Annual Symp. on Theory of Computing*, San Diego, CA. (May 1993).
B. Awerbuch et al., "Throughput–Competitive Online Routing," *34th Annual Symp. on Foundations of Comp. Sci.* Palo Alto, CA (Nov. 1993).
Chapter 5 "Routing in Data Networks," from the Second Edition of *Data Networks* by Dimitri Bertsekas and Robert Gallager, Prentice–Hall (1992).
Chapter 25 "Single–Source Shortest Paths," from *Introduction to Algorithms* by T. H. Comen et al., The MIT Press (1990).
P. A. Humblet et al., "Algorithms for Data Communication Networks—Part 2," Codex Corporation (Jun. 1986).

*Primary Examiner*—Ken S. Kim
*Attorney, Agent, or Firm*—Katharyn E. Olson

[57] ABSTRACT

A method of routing a requested virtual circuit in a network advantageously uses information about concurrent requests for other virtual circuits. Each virtual circuit request in a set of concurrent requests is specified by one or more parameters and each virtual circuit request is routed as a function of one or more parameters of a plurality of the requests. Thereafter, the routing of each request in the set of requests is refined according to a cost function so that the total cost of routing is reduced.

9 Claims, 3 Drawing Sheets

METHOD OF ROUTING A REQUEST FOR A VIRTUAL CIRCUIT BASED ON INFORMATION FROM CONCURRENT REQUESTS

TECHNICAL FIELD

The invention relates to the routing of multiple virtual circuits in networks.

BACKGROUND OF THE INVENTION

Computer networks are a principal means of exchanging or transferring information (e.g. data, voice, text, video, etc.) among host machines connected to the network. The network comprises nodes connected, to each other and to the hosts, by links. Typically, each link is bidirectional, i.e. information may be conveyed in forward and reverse directions, and each link is characterized by a bandwidth capacity in each direction.

An important consideration in network operation is how the information is routed. When information is to be exchanged between two particular hosts, a bidirectional path is established in the network between them. Typically, the path that is established is a so-called "virtual circuit" (VC), by which it is meant that a host simply specifies the destination for the information, and the network delivers the information as though a circuit is connected to the destination. One of many different routes and techniques could be selected to deliver the information, but the particular selection is of no concern to the host. The task of routing is to select the nodes and links between the nodes that comprise the path taken by the VC so as to efficiently utilize network resources, e.g. route as many VCs as possible without exceeding the bandwidth capacity of any particular link. This is often achieved by selecting a path so as to minimize some cost function that reflects the amount of network resources required by the selected path. Although a variety of cost functions can be used, cost functions typically take into account the current network state (i.e., the network topology and current allocation of network resources), delay through the network, etc. Importantly, the routing problem is often further complicated in that the routing must be effectuated "on-line," i.e. without knowledge of what effect future routing demands will have on network resources. Although this problem may be solved by so-called "dynamic-rerouting" techniques, these techniques typically adversely affect the quality of service offered to users of the network.

Many techniques for routing VCs have been suggested. One such technique is minimum hop routing in which the path going through the smallest number of nodes is selected. Another techniques that has been suggested employs exponential cost functions and scaling, has been suggested. See, J. Aspnes et al., "On-Line Load Balancing with Applications to Machine Scheduling and Virtual Circuit Routing," *Proc. 23rd Annual Symp. on Theory of Computing*, San Diego, Calif., May 1993. In the scaling technique, a portion $\gamma$ of the bandwidth capacity of each link is initially allocated, and a cost function is computed for routing a path given that allocated bandwidth. When routing can no longer be achieved in the network with that allocated bandwidth, more bandwidth can be allocated, i.e. $\gamma$ is increased. Typically, the function for determining the cost for a given link in a path for the requested VC is $C_\iota(\chi,\Delta\chi)=\alpha^{\gamma\chi_\iota+\gamma\Delta\chi_\iota}-\alpha^{\gamma\chi_\iota}$, where $C_\iota(\chi,\Delta\chi)$ is the cost for link $\iota$ in the path, $\alpha$ is a constant, $\chi_\iota$ is the fraction of the bandwidth capacity of the link that is in use and $\Delta\chi_\iota$ is the fraction of the bandwidth capacity of the link that is requested by the VC.

SUMMARY OF THE INVENTION

These routing techniques, however, have shortcomings. In particular, it is recognized that previous routing methods do not take into account information available in a "multiple VC request" situation. In such a situation, at any given time, the network may have received two or more concurrent requests to establish VCs. Prior methods simply respond to one of the multiple requests for a VC and route the requested VC, e.g. according to a first-come, first-served discipline, without checking to determine the demands of the other requests. Thus, the routing is truly of the "on-line" type described above even though the network does have some information about what further network routing demands will be as a result of the fact that other requests were concurrently received.

In accordance with the present invention, then, it is recognized that in routing a request for a virtual circuit that information about concurrently requested virtual circuits may advantageously be used. Accordingly, a method is disclosed for routing a set of concurrent requests for virtual circuits, wherein each virtual circuit request is specified by one or more parameters, by routing each request in the set as a function of one or more parameters of a plurality of the requests. In one embodiment of the invention a set of concurrent requests is ordered according to one or more of the parameters, and the requests are then routed in that order. In accordance with a feature of the invention, the routing may be refined by using a local search to exploit to a greater extent the information available from multiple requests for virtual circuits.

BRIEF DESCRIPTION OF THE DRAWINGS

Other features and advantages of the invention will become apparent from the following detailed description taken together with the drawings in which.

DETAILED DESCRIPTION

Figure 1:
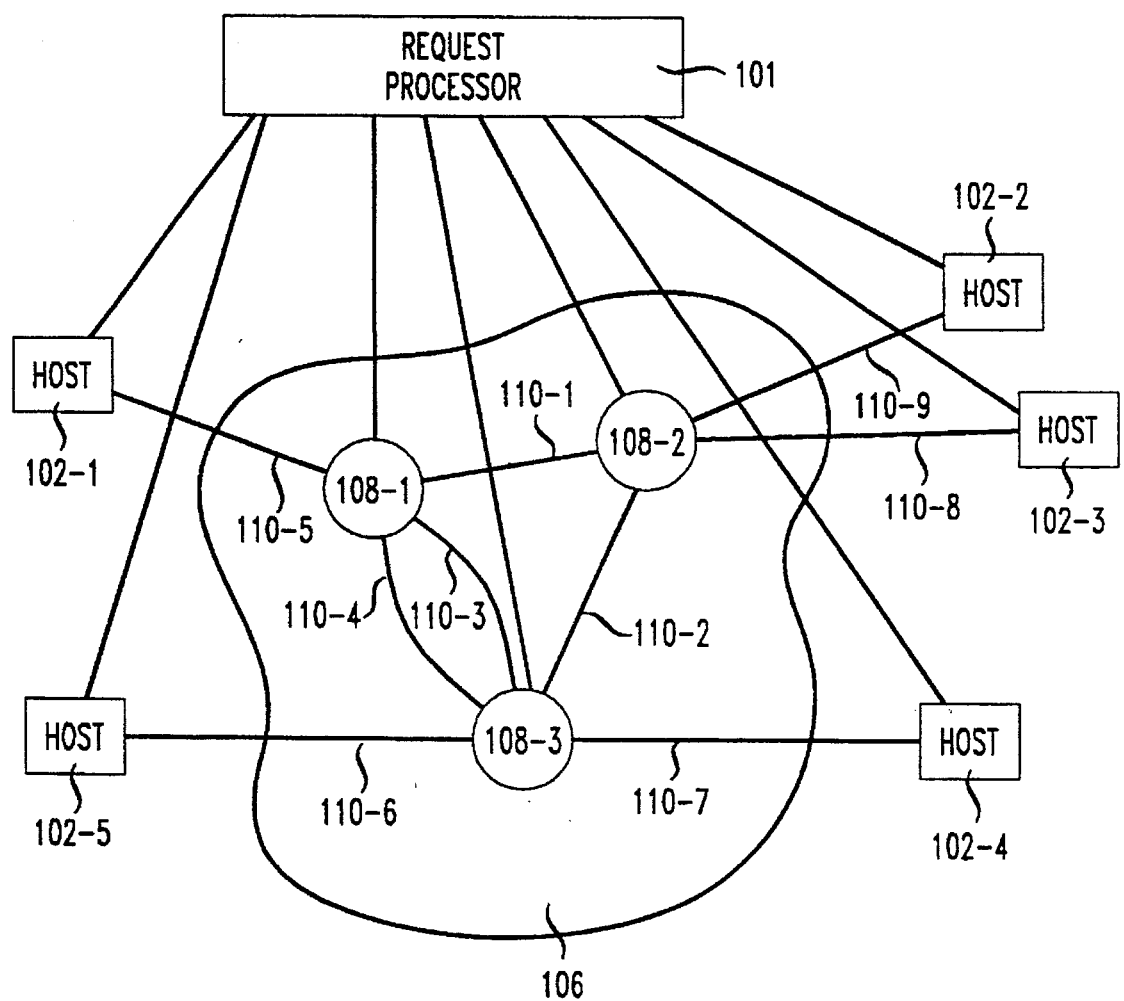
FIG. 1 illustrates a centralized routing network in which the invention may be practiced.

FIG. 1 illustrates the structure of a network in which the invention may be practiced. Hosts 102-i,i=1,2, . . . , exchange information via network 106. Network 106 comprises links 110-k,k=1,2, . . . , connecting nodes 108-j,j=1,2, . . . , to each other and to hosts 102-i. A pair of nodes may be connected by one or more links.

Network 106 in FIG. 1 is a centralized routing system in that network 106 utilizes complete information for routing through use of centralized routing request processor 111. Request processor 111 is connected to hosts 102-i,i=1,2, . . . and to complete information about the network state. Thus, the cost for any path (i.e. the additional network resources required for any path) through the network can be determined, and, using the inventive method described below, all VCs in network 106 of FIG. 1 can be routed efficiently with respect to a given criterion, e.g. maximizing the total amount of bandwidth routed.

Figure 2:
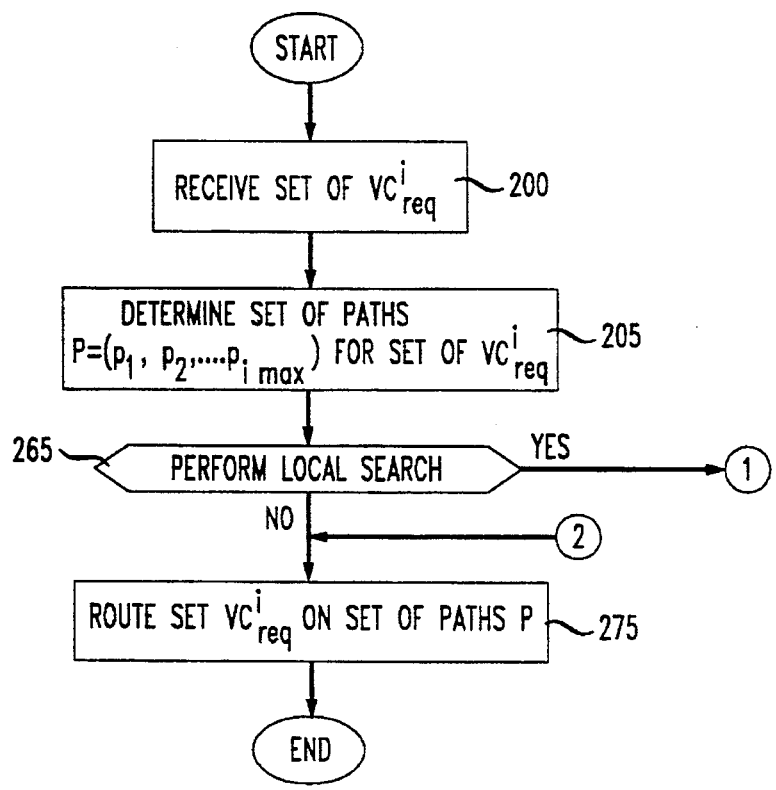
FIG. 2 is a flowchart of the steps in the preferred embodiment.

FIG. 2 is a flowchart of an illustrative routing method with which the present invention may be used. In step 200 of FIG. 2 at any given time, the network must respond to set of $i_{max}$, $i_{max}=0,1,2,\ldots$, requests for establishing VCs. Each individual request, $VC_{req}^i$, $i=1,\ldots i_{max}$ is specified by one or more parameters. For example, each $VC_{req}^i$ may be specified by the source host $S^i$, destination host $D^i$, bandwidth requested in the forward direction $B_f^i$ and bandwidth requested in the reverse direction $B_r^i$. Thus, $$VC_{req}^i = (S^i, D^i, B_f^i, B_r^i)$$

In step 205 of FIG. 2 the information available in the multiple VC request situation is used in routing. Specifically, for each individual request in the set of requests, a path is selected according to function of one or more parameters of a plurality of requests in the set. One illustrative embodiment of the method is described in co-pending application "A Method of Permanent Virtual Circuit Routing," filed concurrently herewith, commonly assigned and hereby incorporated by reference. This embodiment routes permanent VCs (i.e. VCs designed to operate and remain established for time periods on the order of years, as opposed to switched VCs which are designed to operate for hours or days) by first ordering the requests according to a parameter of the requests, e.g. bandwidth, and then using an exponential cost function to route the requests. The ordering process first routes those requests requiring the most network resources according to a cost function and thus requiring the most flexibility in routing. If an objective in the routing is to conserve bandwidth, it is advantageous to order $VC_{req}^i$ in decreasing order of total requested bandwidth (forward and reverse) so that those requests requiring large bandwidths can be accommodated without increasing the risk of exceeding the bandwidth capacity of any link.

Those skilled in the art will now recognize that the information available in the multiple (switched or permanent) VC request situation may be used in a variety of ways and with a variety of, i.e. not necessarily exponential, cost functions. For example, the requests can be routed on a first-come, first-served basis but with knowledge of what the average bandwidth requirement is of the requests in the set of requests. Thus, when a particular request is routed, the cost function for the routing may reflect whether the request requires a large or small amount of bandwidth relative to other requests in the set thereby routing relatively small bandwidth requests on links already near capacity so as to conserve bandwidth on other links for large bandwidth requests.

Returning to step 205, once a set of paths P is determined, an optional local search may be performed, as described below, to refine the set of path selections. In step 275 of the method of FIG. 2, the set of requests are routed on the set of path P.

Figure 3:
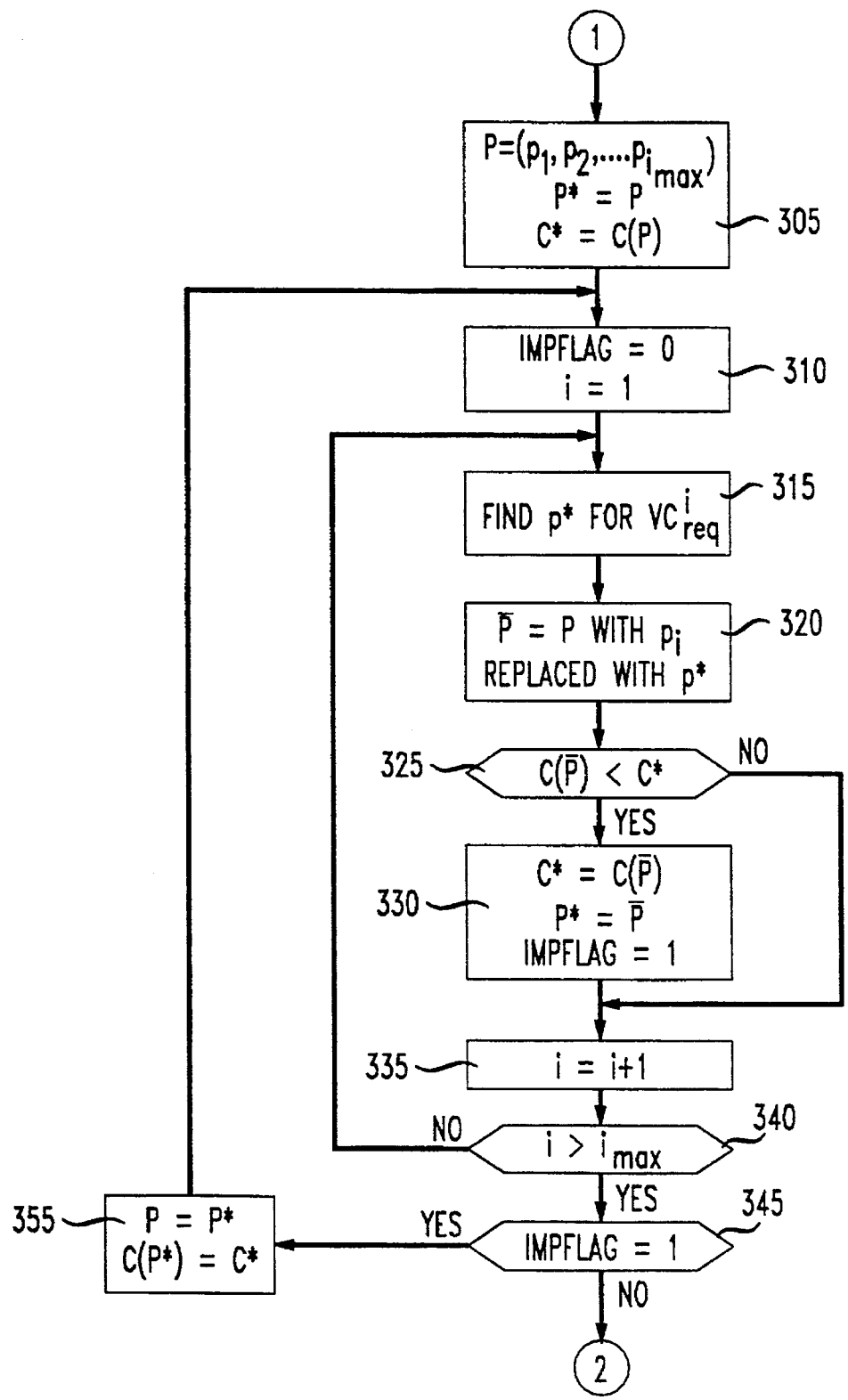
FIG. 3 is a flowchart of steps of a local search feature of the invention.

The optional local search of step 265 can be used to refine the selection of paths so that the total cost of routing all VCs can be reduced. The steps in one embodiment of the local search of step 265 are illustrated in the flowchart of FIG. 3. In step 305 variables are initialized. In particular, P is defined as the set of paths $\{p1, p2, \ldots, pi_{max}\}$ associated with the $i_{max}$ VC requests as determined by a routing method, e.g. the method of FIG. 2. The current set of best paths for routing is stored in $P^*$ and the cost of routing that current set of best paths is $C^*$. Initially, $P^*=P$ and $C^*=C(P)$ where C is a second cost function, described below, which determines the cost of routing all the $VC_{req}^i$. In step 310 a flag, called impflag, is set to zero and a counter $i, i=1,2 \ldots i_{max}$, is set to 1.

In step 315 a particular $VC_{req}^i$ and its associated path $p_i$ are selected. For illustrative purposes in FIG. 3 the $VC_{req}^i$ are selected in increasing order of i. For the selected i a search is made for a lowest cost path $p^*$ for routing $VC_{req}^i$ (using, for example, Cost$^1$) assuming all other $VC_{req}^i$ are routed as in the set P. A new set of paths, $\bar{P}$, is formed in step 320 by setting $\bar{P}$ to P except for the selected $p_i$ which is set to $p^*$. In step 330 if $C(\bar{P}) < C^*$, then $P^*$ and $C^*$ are set to $\bar{P}$ and $C(\bar{P})$, respectively, and impflag is set to one.

Steps 315–340 are repeated for each successive $VC_{req}^i$. When all $i, i=1,2,\ldots i_{max}$, have been examined for potential rerouting, impflag is checked to see if any improvement in routing is possible. If impflag is zero, no alternative routing of any one $VC_{req}^i$ will reduce the cost of routing all $VC_{req}^i$, and the search is ended. As indicated in step 345, if impflag has been set to one, there exists an alternative routing (i.e. a new shortest path) for one $VC_{req}^i$ that results in the greatest reduction in routing cost. In step 355, that new lowest cost path, reflected in $P^*$, becomes P. The $VC_{req}^i$ are now to be routed according to $P^*$ at cost $C(P^*)$. Steps 310–355 are repeated until no new paths are found that reduce the cost.

The second cost function may advantageously be selected as $$Cost^2 = \sum_{\text{all links } l} [[(A)^{i}_{f,l'}{}^{\Sigma \Delta B^j_{f,l}} - (A)^j_{f,l}] + C \Delta B^j_{f,l}] + \qquad (2)$$

$$\sum_{\text{all links } l} [[(A)^{i}_{r,l'}{}^{\Sigma \Delta B^j_{r,l}} - (A)^j_{r,l}] + C \Delta B^j_{r,l}]$$

where the variables in the equation are defined as for equation 1 and where the sum in each exponential and in the linear term is over all $VC_{req}^i$ such that their associated path uses the link in the outer summation. Thus, the second cost function gives the total cost of routing multiple $VC_{req}^i$ on their associated paths.

The steps in FIG. 3 reflect a so-called "greedy" heuristic in which each possible alternative path for each $VC_{req}^i$ is examined to see which alternative path, if any, reduces the cost of routing by the greatest amount. That alternative path is then selected as the new path associated with the VC. The process is repeated until no alternative path for any $VC_{req}^i$ will reduce the cost of routing all the requests. Those skilled in the art will recognize that other local searches utilizing other search criteria can be used. For example, instead of searching through all the alternative paths to find the one that reduces the cost of routing all $VC_{req}^i$ the most, it may be sufficient simply to find a first alternative path that reduces costs by any amount. Then the search could simply go onto the next $VC_{req}^i$. This "less greedy" heuristic searches the solution space differently and can potentially converge to a better "local minimum" than the "greedy" heuristic. This is highly dependent on the list of $VC_{req}^i$ being routed and the current state of the network.

Figure 4:
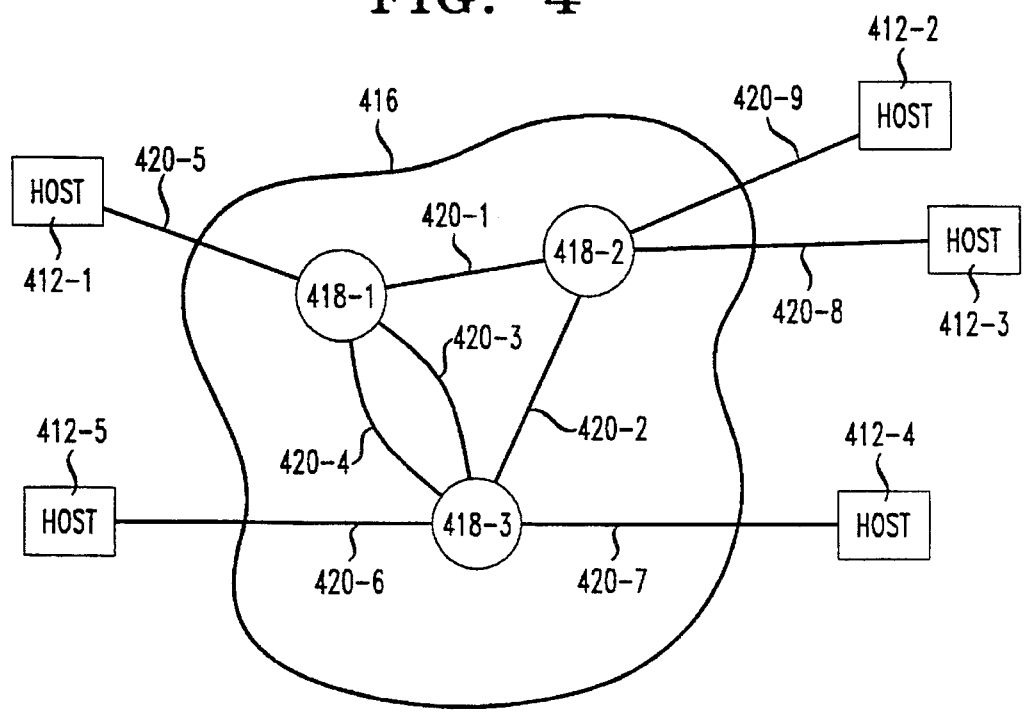
FIG. 4 illustrates a distributed routing network in which the invention may be practiced.

FIG. 4 illustrates the structure of a distributed network 416, comprising nodes 418-m and links 420-n, in which the inventive method may be practiced. Network 416 is a distributed routing system in that each node 418-m periodically exchanges state information. The state information reflects the amount of network resources available or in use on a link from a node to every neighboring node. Thus, the cost for any path through the network can be determined. However, unless the state information propagates quickly relative to the speed with which VCs are established and torn down, the information will be incomplete (e.g. dated). Thus, each node may have a different description of the network state, and this description is called the local network state.

The methods described above can be used in a distributed routing system except that incomplete state information (i.e. the local network state) is used. Note however, the paths determined based on the incomplete information may no longer be available (e.g. the capacity of a link may have become exhausted since the most recent state information was received) when the VC is actually to be routed (as for example in the routing of step 275 of FIG. 2). Requests for VCs that are not successfully routed, e.g. those requests for which the selected path is not available, may be included in the next set of requests or may form a new set of requests. Note further that it is advantageous when routing in a distributed routing system not to update the local network state until an entire set of requests has been routed. This ensures that procedures, such as the search routine of FIG. 3, will terminate.

This disclosure describes a method of routing multiple virtual circuit requests using information available in the multiple VC request situation. The method disclosed herein have been described without reference to specific hardware or software. Instead, the method has been described in such a manner that those skilled in the art can readily adapt such hardware and software as may be available or preferable for particular application.

We claim:

1. A method of routing a set of requests for virtual circuits comprising the steps of:

receiving a set of requests for virtual circuits wherein each request is specified by one or more parameters; and routing each request in said set of requests on a path through a network, wherein said path is selected as a function of one or more parameters of a plurality of the requests.

2. A method of routing requests for virtual circuits in a network comprising the steps of:

receiving a set of requests, wherein each request in said set of requests represents a request to route a permanent virtual circuit through said network and wherein each request is specified by one or more parameters; and routing each request on a path through said network, said path being selected according to a first function, said path satisfying said parameters specifying each request and wherein said first function is a function of one or more of said parameters of a plurality of said requests.

3. The method of claim 2 wherein said network has a network state and wherein said method further comprises the step of updating said network state to reflect the selected path.

4. The method of claim 2 comprising the further step of establishing the requests in an order according to a function of one or more said parameters prior to the routing step, the routing step routing said requests in said order.

5. The method of claim 2 wherein said network comprises a set of links and a set of nodes, wherein a first node and a second node are connected by one or more links in said set of links and wherein each selected path through the network is specified by a set of links.

6. The method of claim 2 wherein each selected path connects a first host and a second host.

7. The method of claim 2 further comprising the steps of:

selecting an alternative path to one of said selected paths, determining the value of a second function using said alternative path, and determining the value of said second function using said selected path, and if said alternative path improves the value of said second function relative to said selected path, then replacing said selected path with said alternative path.

8. The method of claim 7 further comprising the step of:

repeating the steps of selecting an alternative path, determining values for said second function and replacing until selecting no alternative path will improve said second function.

9. The method of claim 7 wherein said network has a network state and wherein said second function is a function of the network state and one or more of said parameters.

\* \* \* \* \*